United States Patent [19]
Guerra et al.

[11] Patent Number: 5,183,853
[45] Date of Patent: Feb. 2, 1993

[54] ARTICLES OF A NEW CRYSTALLINE FORM OF SYNDIOTACTIC STYRENE POLYMER

[75] Inventors: Gaetano Guerra, Salerno; Vincenzo M. Vitagliano; Paolo Corradini, both of Napoli; Enrico Albizzati, Arona, all of Italy

[73] Assignee: Himont Incorporated, Wilmington, Del.

[21] Appl. No.: 485,928

[22] Filed: Feb. 27, 1990

[30] Foreign Application Priority Data

Feb. 28, 1989 [IT]  Italy .................. 19588 A/89

[51] Int. Cl.$^5$ .................. C08L 71/12; C08F 6/00; C08F 12/08
[52] U.S. Cl. .................. 525/132; 525/151; 526/346; 526/347.2; 528/481; 528/502; 428/402
[58] Field of Search .................. 526/347.2, 346; 528/481, 502; 525/132, 151; 428/402

[56] References Cited

U.S. PATENT DOCUMENTS 4,946,897  8/1990  Albizzati et al. .............. 526/346 X

FOREIGN PATENT DOCUMENTS 0271875 12/1987  European Pat. Off. .
0314146 10/1988  European Pat. Off. .
1215808  8/1989  Japan .................. 528/481
1271405 10/1989  Japan .................. 528/481

OTHER PUBLICATIONS

Guerra, Gaetano et al., "Polymorphism in Melt Crystalline Syndiotactic Polystyrene Samples", Macromolecules, vol. 23, No. 5, pp. 1539–1544, 1990.
Derwent Abstract 88-136375, of Japanese Patent 63-077905.
CA112(16):140057e, of Japanese Patent 88-101290.

*Primary Examiner*—Fred Teskin

[57] ABSTRACT

Articles of syndiotactic styrene polymer where the polymer is present predominantly in a new crystalline form characterized by an X-ray spectrum which presents reflections of maximum intensity at 2 $\theta$ of 12.2° and 20.0°, where in the 2 $\theta$ range from 15° to 18° no reflections of appreciable intensity appear.

6 Claims, 7 Drawing Sheets

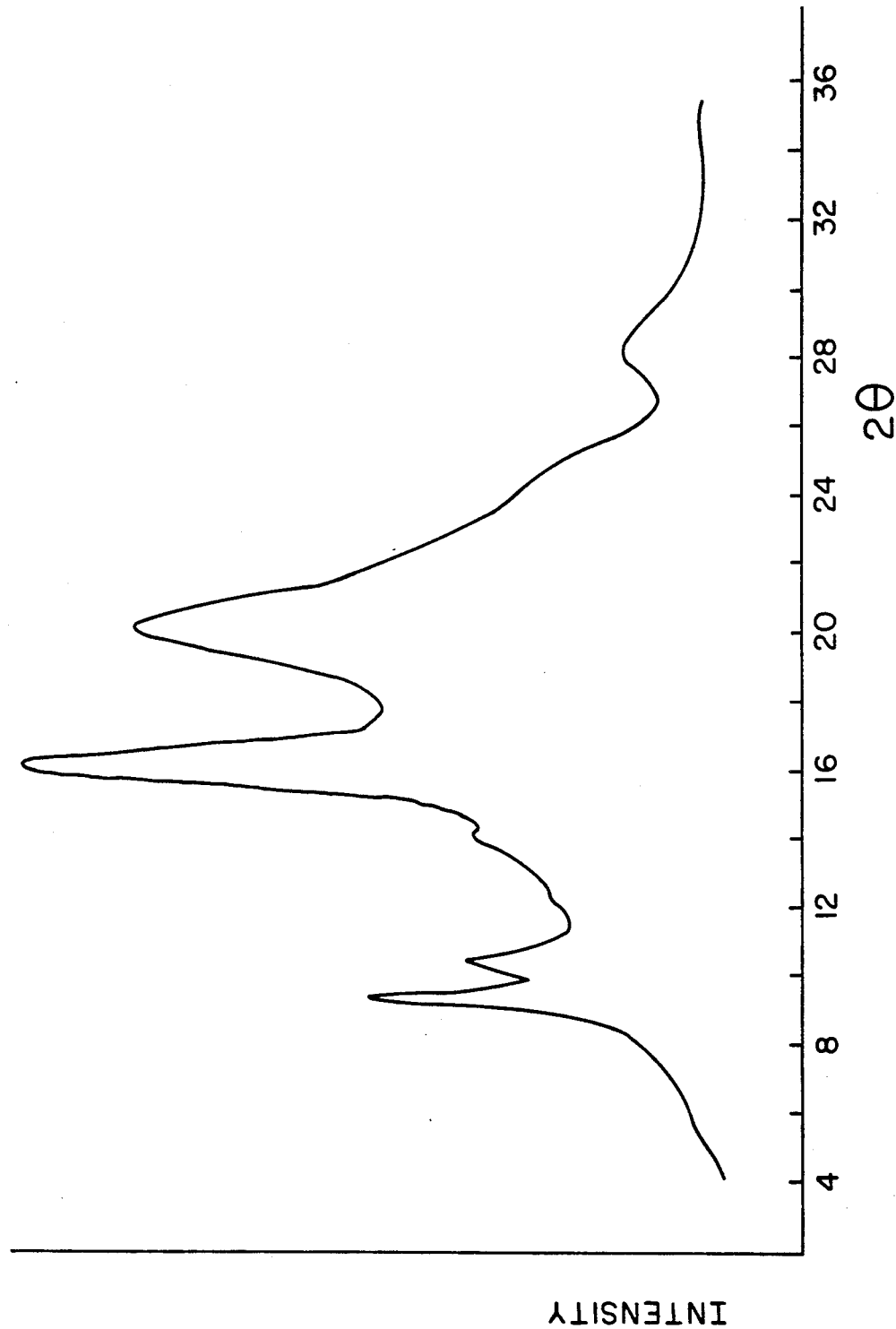

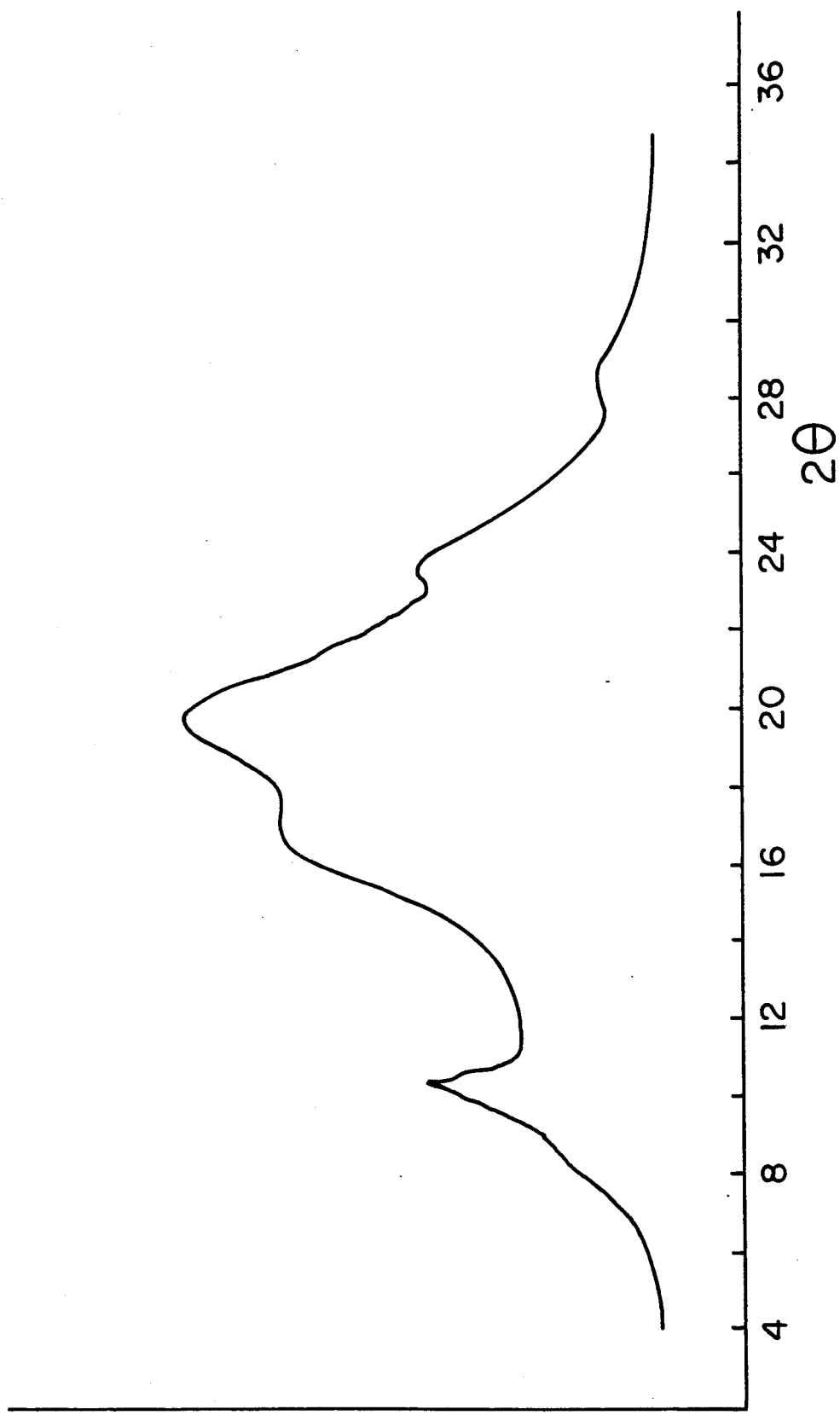
FIG. ID

ARTICLES OF A NEW CRYSTALLINE FORM OF SYNDIOTACTIC STYRENE POLYMER

This invention refers to articles of syndiotactic styrene polymer where the polymer is present in a new crystalline form.

It is well known that the syndiotactic polystyrene is characterized by a complex polymorphism. A crystalline form characterized by the X-ray diffraction spectrum shown in FIG. 1A (alpha form) is described in literature, and has a melting temperature (measured from the peak temperature of the melt endotherma in DSC scanning at 2.5 K/min.) close to 270° C.

This is the form which is present, predominantly or completely, in products or pellets which are obtained with normal melt process techniques from synthesis powders of syndiotactic polystyrene.

It is also known (Polymer Reprints Japan Engl. Ed.-1988, 37 E 428) that through processes of solvent evaporation at high temperatures from syndiotactic polystyrene solutions it is possible to obtain a crystalline form characterized by the X-ray diffraction spectrum of FIG. 1B (beta form), having a melt temperature very close to the one of the alpha form. This form has been obtained up to now only through solution evaporation processes.

Through precipitation or evaporation of solvent at low temperatures and subsequent complete removal of the solvent, a third crystalline form can be obtained, which is characterized by the X-ray diffraction spectrum of FIG. 1C (gamma form).

Samples which are not completely dried provide X-ray diffraction spectra where the intensity and exact positions of the reflection change when the solvent changes; this phenomenon clearly indicates the presence of solvent molecules in the crystalline structure.

This variable crystalline structure, which includes solvent molecules, shall be referred to herein as the delta form. As an example, in FIG. 1D is shown the X-ray diffraction spectrum of a sample precipitated from a solution in o-dichlorobenzene and vacuum dried at 60° C.

Delta form samples, after having been treated at temperatures higher than 130° C., lose solvent and transform into the gamma form. Gamma form samples when treated at temperatures higher than 180° C. transform into irregular modifications of the alpha form.

A rapid heating of delta form samples at annealing temperatures higher than 100° C. brings on transformation into the beta form.

The preparation of articles of manufacture by processing a melt of synthesis powders (where the polymer is present in alpha or gamma form), or pellets or semifinished products (where the polymer is mostly in alpha form) obtained according to normal melt processing techniques, generally results in products which are not very reproducible because of the presence of crystalline forms whose relative quantities depend on processing conditions.

Finally it is well known (Makromol, Chem., Rapid Commun, 1988, 9 761) that products made from powders of the alpha crystalline form, in the presence of a whole series of solvents (such as methylene chloride, dichloroethane, dibromoethane) absorb the solvent in the crystal lattice and change to a delta type crystalline form.

The object of this invention is the manufactured articles such as pellets, semifinished products, joint molded, film, fibers, etc. produced from a syndiotactic styrene polymer, where the polymer is present in a new crystalline form.

FIG. 1C is an X-ray diffraction of the crystalline gamma form of syndiotactic polystyrene.

FIG. 1D is an X-ray diffraction of the crystalline delta form of syndiotactic polystyrene.

The new crystalline form (beta'form) is characterized by an X-ray spectrum (Cu $K\alpha$) similar to the one for the beta form, but unlike said form as well as unlike the other known crystalline forms of the syndiotactic polystyrene, the beta form does not present appreciable reflections in the $2\theta$ range between 15° and 18°. By appreciable reflections are meant those having an intensity greater than 1/30 of the maximum intensity reflection, which appears at $2\theta = 20°$. In addition, another intense reflection appears at $2\theta = 12.2°$.

Figure 2:
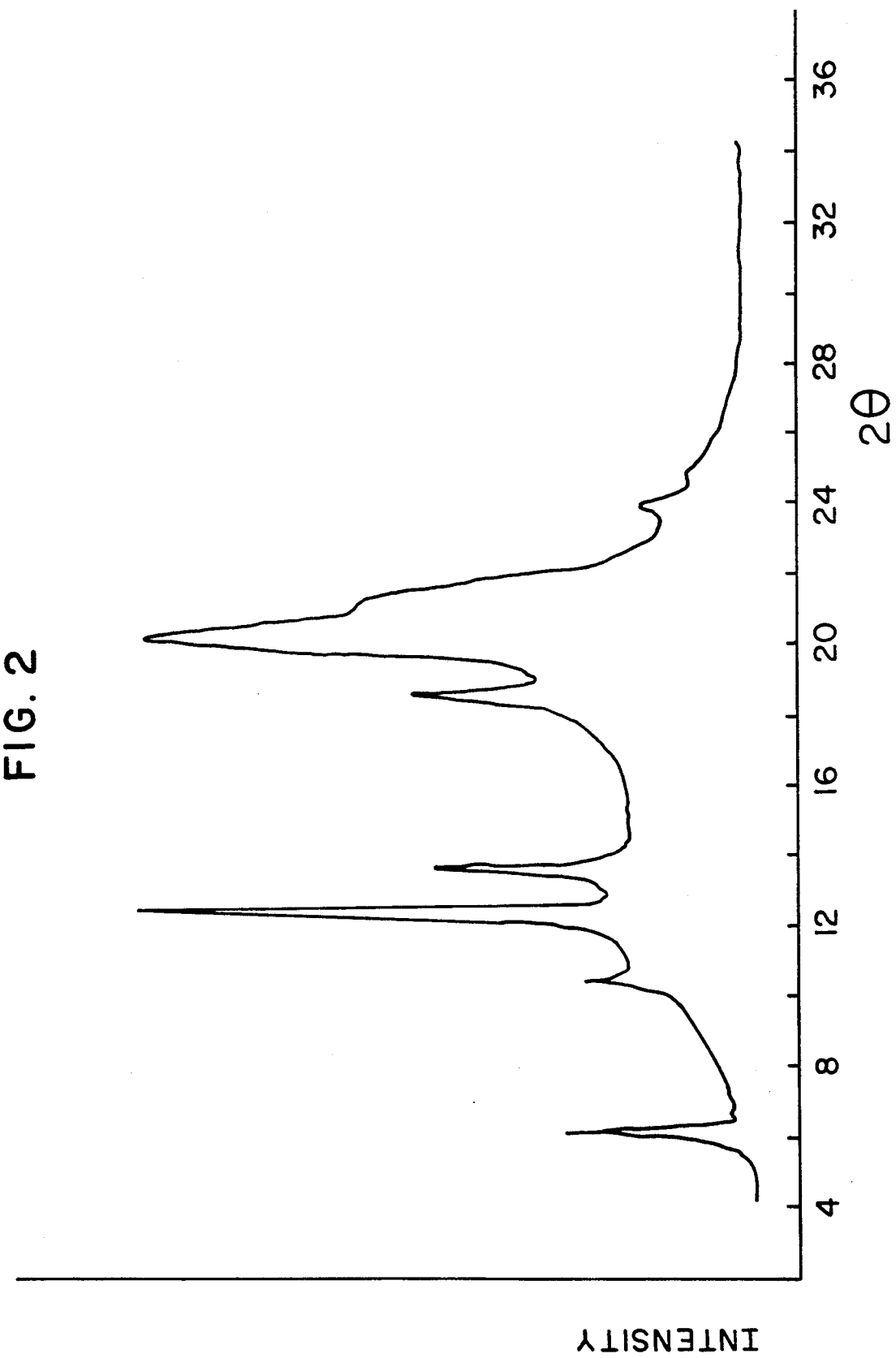
FIG. 2 is an X-ray diffraction of the new crystalline (beta') form of syndiotactic styrene homopolymer of the present invention.

The spectrum of the new crystalline form is shown in FIG. 2. The melting point of the beta' form is close to the one for alpha and beta forms.

The new form presents the advantage, with respect to the other known forms, of creating products with better reproducibility compared to the ones obtained up to now with normal processing techniques from the melt of the alpha, delta or gamma crystalline forms or of combinations thereof.

This is because the manufactured articles of this invention are always made up of the same form, i.e. beta', while in the products of the known types, the crystalline forms (a mixture of alpha and beta') are present in variable quantity depending on the manufacturing conditions used.

Moreover, the articles produced from the new crystalline form have the advantage, compared to the articles produced from the known types, of being more resistant to a series of solvents, such as methylene chloride, dichloroethane, dibromoethane and chloroform.

For the articles produced from the new syndiotactic styrene polymer crystalline form are meant the articles where the syndiotactic styrene polymer is substantially present in the new crystalline form.

Substantially present in the new form means those where, through X-rays analysis as indicated below, the presence of the alpha crystalline form cannot be detected in an appreciable amount, generally greater than 10%.

To determine the amount of alpha form in the samples where both the alpha and beta' forms are present, the X-ray diffraction spectrum in the $2\theta$ range form 10° to 15° is considered.

As a base line, the segment connecting the two minima located around 10.8° and 14.8° is selected. The area of the two peaks present at 11.6° and 12.2° [A(11.6) and A(12.2)] and the percentage of alpha form contained in the total crystalline fraction is evaluated by the approximate relation:

$x = [2 A(11.6)/A(12.2)]/[1 + 2 A(11.6)/A(12.2)]$

By syndiotactic styrene polymer in the new crystalline form is meant the polymer where the syndiotactic structure is present at least for long portions of the chain.

This polymer is obtained for example by operating according to the method described in published European patent application n. 0271875.

This method consists in carrying out the polymerization of the vinyl aromatic monomer, either alone or in admixture with another copolymerizable ethylenically unsaturated monomer, in the presence of a catalyst system comprising the product of the reaction between:

a) a compound of a transition metal (M), containing at least one M-O; M-C; M-N; M-P; M-S or M-halogen bond (such as, for example, $TiCl_3N(C_2H_5)_2$, $Ti(OC_4H_9)_4$, bisacetylacetonate, titanium dichloride and $TiCl_4$); and b) an alumoxane compound such as methylalumoxane.

The syndiotactic styrene polymer of the invention include styrene copolymers with $CH_2=CH-R$ olefins, where R is an alkyl-aryl or an halogen-aryl radical with 6-20 carbon atoms, or with other ethylenically unsaturated monomers which can be copolymerized with styrene, in said copolymers the styrene units having the syndiotactic structure and the copolymers being crystallizable in the beta' form.

The articles of the new beta' form are obtained by processing the melt of syndiotactic styrene polymer synthesis powders (where the polymer is present in alpha or gamma form), or semifinished products in alpha form (pellets, etc.) using different manufacturing processes.

One process consists in treating, for less than a minute, the melt from synthesis powders properly dried, at temperatures at least 50° C. higher than the melting temperature of the polymer.

Lower operating temperatures bring about the formation of alpha or mixed forms. This procedure can present a drawback in that the elevated temperature, in the absence of accurate control, may cause a degrading phenomena with the consequent formation of bubbles in the products.

Figure 1A:
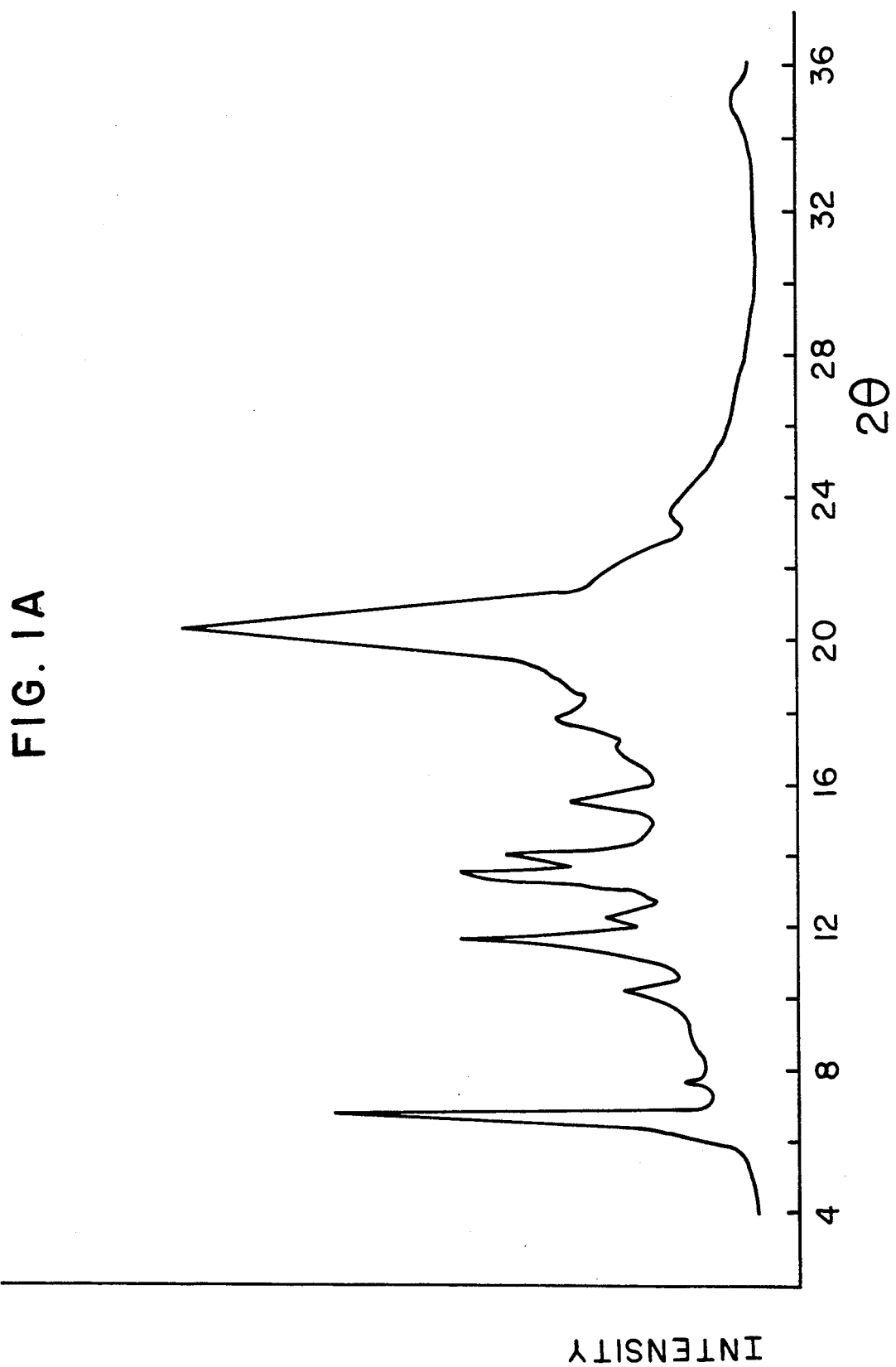
FIG. 1A is an X-ray diffraction of the crystalline alpha form of syndiotactic polystyrene.
Figure 1B:
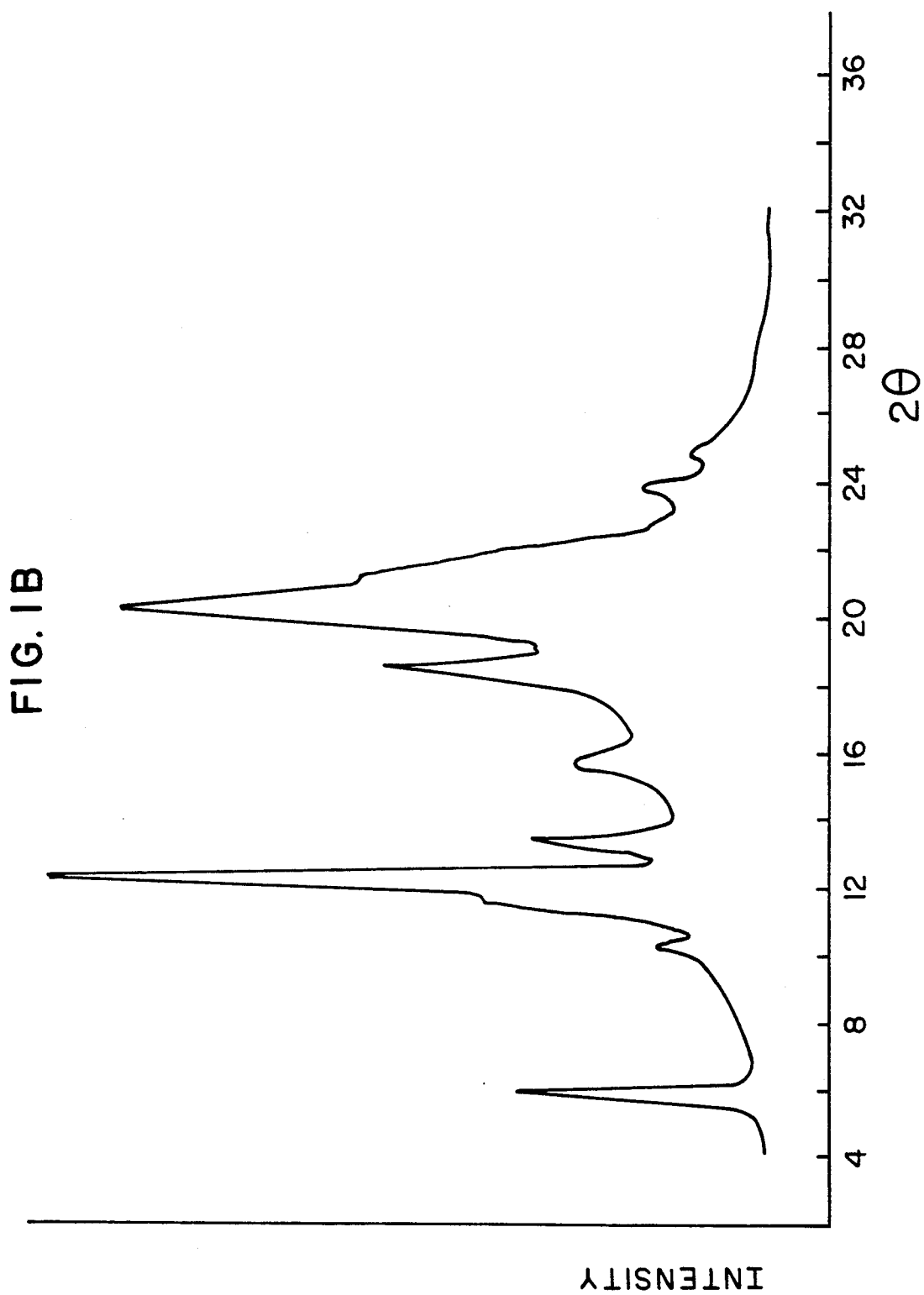
FIG. 1B is an X-ray diffraction of the crystalline beta form of syndiotactic polystyrene.

Another possible process is to start from polymer powders as obtained by synthesis, not completely dry, characterized by diffraction spectra similar to the one in FIG. 1D, and to submit said powders to sudden or rapid heating until the process temperature is reached.

In particular, for heating speeds higher than 20 K/min., the minimum process temperature to obtain pure beta' form is considerably lower, that is to say that it is, depending on the process times and products thickness, 10°-30° C. higher than the melting temperature of the polymer.

One drawback of this process is one must deal with powders containing an amount of solvent between 5 and 10% by weight, which may cause problems in the quality of the articles produced and in the manufacturing process.

The simplest process for obtaining products in beta' form is to use beta' form pelletized polymer. This polymer is easily obtained through pelletizing processes operating at temperature conditions necessary for the formation of beta' form.

The products of the invention include, besides those formed by the beta' form of the syndiotactic styrene polymer, also those that can be obtained by processing from the melt of at least one syndiotactic styrene polymer mixed with other compatible polymers, where the styrene polymer is present in the beta' form.

In another embodiment of the invention, has been found, when processing from the melt of the polyphenylene ethers mixed with syndiotactic styrene polymer in one of the known forms (alpha and/or delta, etc.), the pure beta' form is obtained at operating temperatures 20°-30° C. higher than the melting temperature.

The operating temperature depends on the composition of the mixture and the process time. For compositions with 5% polyphenylene ether, the temperature is 300° C. for periods of 10 min.; for shorter periods the temperature is 310° C.

For compositions with 40% polyphenylene ether, the temperature is 290° C. for periods of 10 min.; for shorter periods it is 300° C.

The styrene polymer in beta' form is present in the mixtures in the polyphenylene ethers in quantities from 60 to 95% b weight.

The usable polyphenylene ethers are well known in literature, and they include homopolymers and copolymers containing repeating units of the formula:

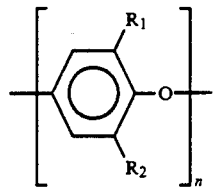

where the oxygen of one unit is linked to the benzene ring of the adjacent unit; n is an integer greater than 50, $R_1$ and $R_2$ are the same or different and are hydrogen or hydrocarbyl radicals without a tertiary carbon in alpha position, halo-hydrocarbyl or halo-hydrocarboxyl radicals which contain at least two carbon atoms between the benzene ring and the halogen atom and do not contain a tertiary carbon in the alpha position.

The preferred polyphenylene ethers are those where at least one of the $R_1$ and $R_2$ radicals is an alkyl group with 1-4 carbon atoms. The one most preferred is poly(2,6-dimethyl-1,4-diphenylene)ether.

In reference to the resistance to solvents of the beta' crystalline form it has been found that, while products in alpha form absorb, even in the crystalline phase, a whole series of solvents (methylene chloride, chloroform, iodomethane, dibromomethane, dibromoethane, etc.). The beta' form products absorb only in the amorphous fraction and the crystalline fraction remains unaltered. For example, after one hour of immersion in methylene chloride at room temperature, the alpha crystalline form is completely transformed, while even after two days of immersion under the same conditions, the beta' form does not undergo any alteration.

The following examples are supplied in order to illustrate the invention without limiting the scope thereof.

EXAMPLE 1

Syndiotactic styrene homopolymer powder obtained according to process described in example 1 of published European application n. 0271875 was used. The method is described hereinbelow.

Into a glass reactor having an internal volume of 100 ml and being equipped with a stirrer there were placed, in an inert atmosphere and at 20° C.:

252 mg of methylaluminoxane (A)
10 ml of toluene
34 mg of Ti(OC$_4$H$_9$)$_4$.

After 5 minutes, 30 ml of styrene passed through an alumina column and distilled over LiAlH$_4$ were added. Within 30 minutes the temperature was brought to 50° C. and polymerization was conducted for 4 hours. After this period of time, the polymer was coagulated with methanol, acidified with hydrochloric acid and repeatedly washed with methanol. After drying there were obtained 16 g of polymer (corresponding to a conversion of 59%).

(A) Methylaluminoxane was prepared as follows: Into a three-neck flask having an internal volume of 500 ml, equipped with a dropping funnel, a stop cock and a magnetic stirrer, there were placed 37.1 g of Al$_2$(SO$_4$)$_3$.18H$_2$O and 250 ml of toluene in a nitrogen atmosphere.

50 ml of Al(CH$_3$)$_3$ were placed into the dropping funnel and were added under stirring within 30 minutes. The reaction was carried out at 60° C. for 3 hours. The aluminium sulphate was filtered off from the suspension and the solvent was removed. 15.5 g of a solid white product were obtained.

The powder was treated at 130° C. under vacuum for 2 hours and had a residual solvent content of less than 0.5% by weight.

Syndiotactic polystyrene plates about 1 mm thick were obtained by compression molding at a pressure of 2 Kg/cm$^2$. The powder was introduced directly into the press at various maximum temperature and was kept at that temperature under pressure for 10 min. The sample was then cooled in the press by circulating water.

Figure 3:
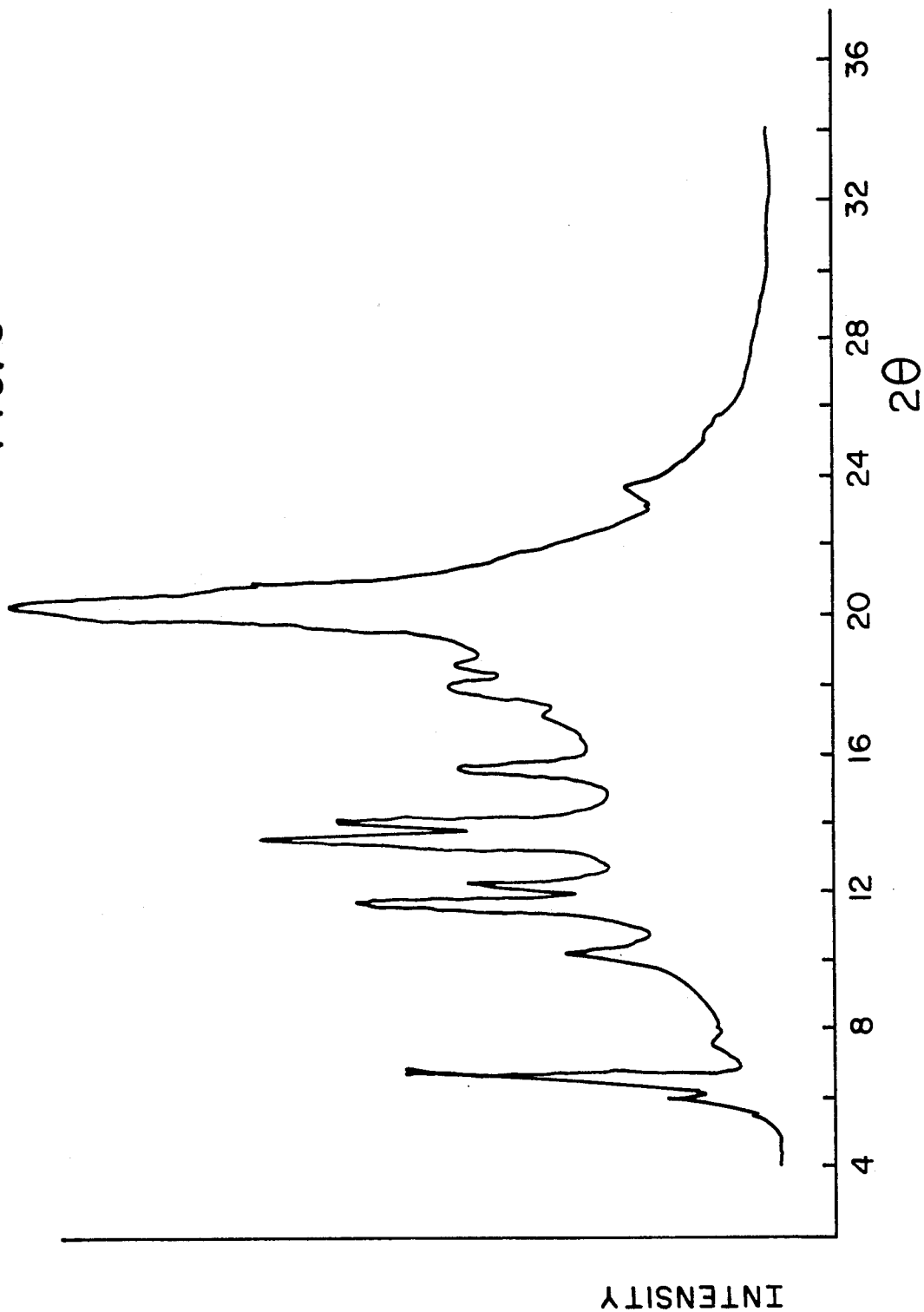
FIG. 3 is an X-ray diffraction of mixed crystalline forms, alpha and beta', of syndiotactic polystyrene.

Operating at 320° C. a plate was obtained whose X-ray diffraction spectrum is typical of the beta' form (FIG. 2); operating at 280° C. the typical alpha form spectrum was obtained (FIG. 1A); at an intermediate temperature mixed forms were obtained: for example, operating at 300° C. a plate was obtained which presented the X-ray diffraction spectrum shown in FIG. 3, from which it was possible to detect an alpha form percentage content equal to 80%.

Figure 4:
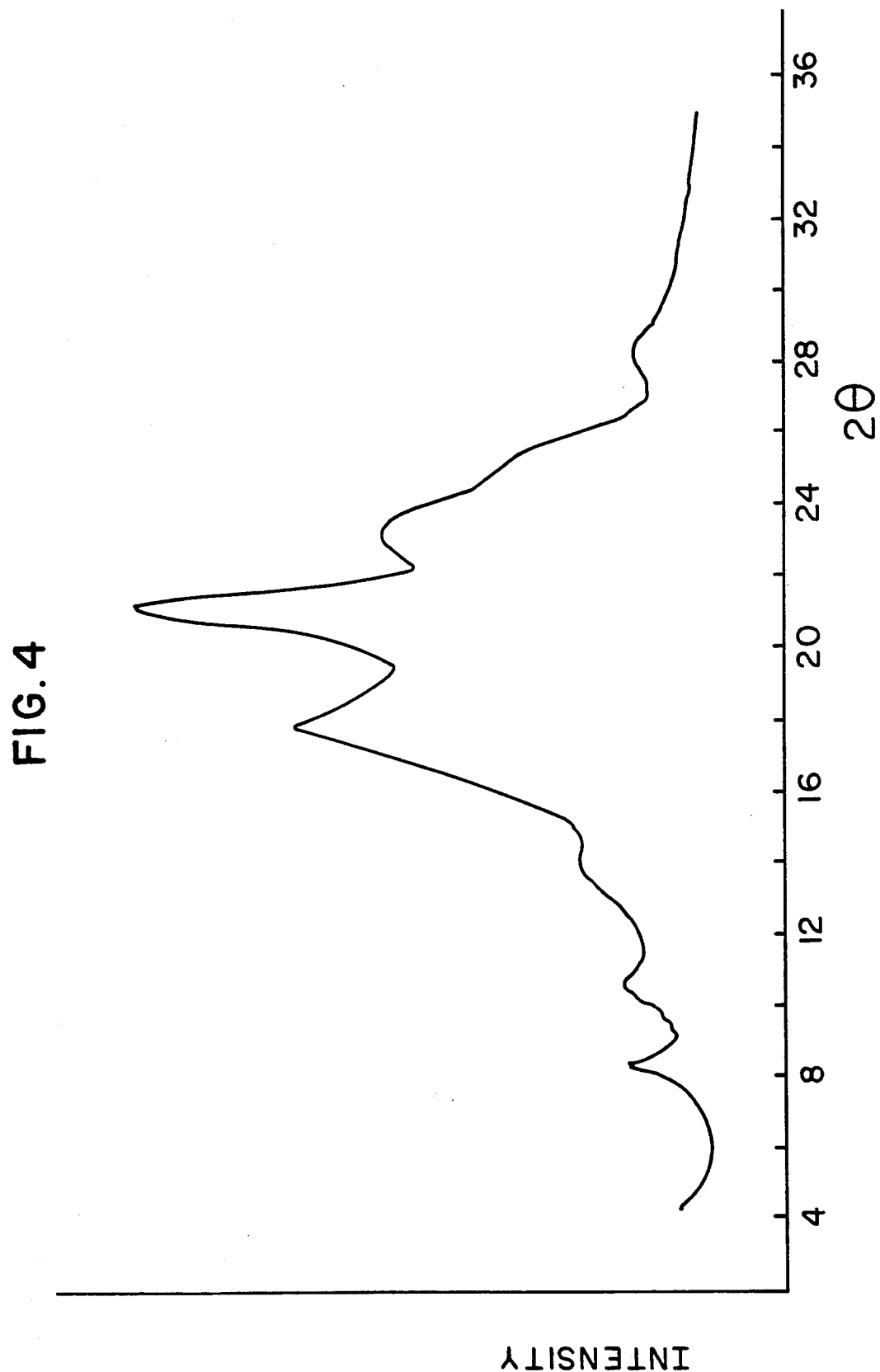
FIG. 4 is an X-ray diffraction of the crystalline delta form of syndiotactic polystyrene.

After immersion in methylene chloride at room temperature for 16 hours the behaviour of the three plates was completely different. The alpha form plate absorbed solvents in quantities close to 30% by weight and modified its crystalline structure: for example after having been dried at 80° C. under vacuum for 16 hours, the plate presented the X-ray diffraction spectrum shown in FIG. 4, which is similar to the one in FIG. 1D (delta type form).

The mixed form plate, under the same conditions, absorbed about 26% of the solvent and also modified its structure: the X-ray diffraction figure obtained after drying the sample at 80° C. for 16 hours, presented beta' form peaks unaltered with respect to those present in the spectrum of the original sample, together with typical delta form peaks which had substituted the alpha form peaks.

Under the same conditions, the beta' form plate absorbed only the 16% of the solvent and its crystalline structure was not altered: the X-ray diffraction spectrum after drying at 80° C. for 16 hours was practically identical to the one in FIG. 2.

EXAMPLE 2

The same powder as in example 1 was used.

The synthesis powder was dried at 60° C. under vacuum for 2 hours and presented a residual solvent content (o-dichlorobenzene) close to 10%. The compression molding process was the one described in example 1, with a very high heating speed estimated at over 80 K/min.

In this case, independently from the processing temperature and time, a plate was obtained with an X-ray diffraction spectrum of the beta' form (FIG. 2).

Said plate, even after having been immersed in methylene chloride at 50° C. for 100 hours, presented an X-ray diffraction spectrum practically unaltered, which indicated that its crystalline structure did not change.

EXAMPLE 3

A syndiotactic styrene homopolymer (prepared as in example 1) and polyphenylene oxide mixture was used. A mixture containing 30% of polyphenylene oxide was prepared by dissolving the two polymers in o-dichlorobenzene and then co-precipitating them in methanol. The mixture was dried at 160° C. under vacuum for 1 hour. The compression molding process of the dry mixture was the same as described in example 1.

Operating at 300° C., a plate with an X-ray diffraction spectrum of the beta' form was obtained, which remained unaltered after having been treated with solvents.

Other features, advantages and embodiments of the invention disclosed herein will be readily apparent to those exercising ordinary skill after reading the forego in disclosure. In this regard, while specific embodiments of the invention have been described in considerable detail, variations and modifications of these embodiments can be effected without departing from the spirit and scope of the invention and described and claimed.

We claim:

1. A manufactured article comprising syndiotactic styrene polymer, wherein the styrene polymer is predominantly in crystalline beta' form having an X-ray spectrum having maximum intensity reflections at $2\theta$ equal to 12.2° and 20° and no appreciable intensity reflection at $2\theta$ from 15° to 18° and obtained by processing the melt of the syndiotactic styrene polymer at a temperature of 50° C. higher than the melting temperature of said polymer.

2. Pellets comprising the styrene polymer of claim 1.

3. The article of claim 1 wherein the beta' form constitutes more than 90% of the syndiotactic styrene polymer crystalline fraction.

4. The pellets of claim 2 wherein the beta' form constitutes more than 90% of the syndiotactic styrene polymer crystalline fraction.

5. A manufactured article obtained by processing the melt of syndiotactic styrene polymer and polyphenylene ether mixture containing 60–95% by weight of syndiotactic styrene polymer, wherein the styrene polymer is present in the beta' form of claim 1.

6. Pellets obtained from syndiotactic styrene polymer and polyphenylene ether mixture containing 60–95% by weight of syndiotactic styrene polymer, wherein the styrene polymer is present in the beta' form of claim 1.

* * * * *